Dec. 3, 1929.  J. H. WAGENHORST  1,737,780
METHOD OF MAKING TUBULAR SPOKED WHEELS
Filed March 4, 1922
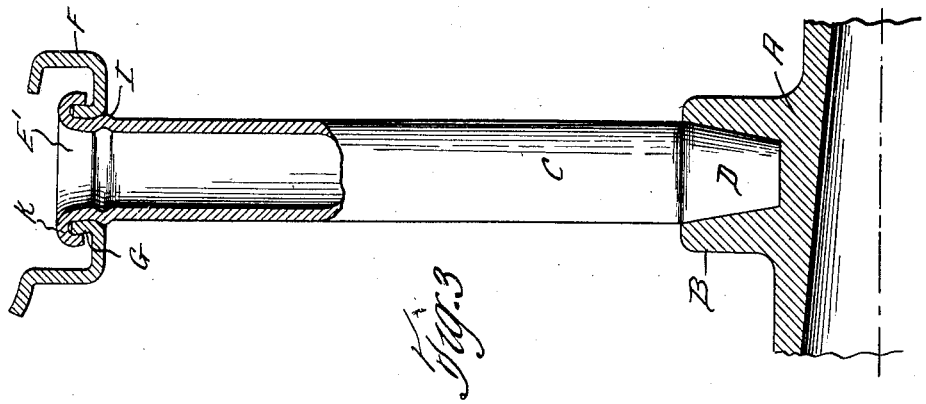
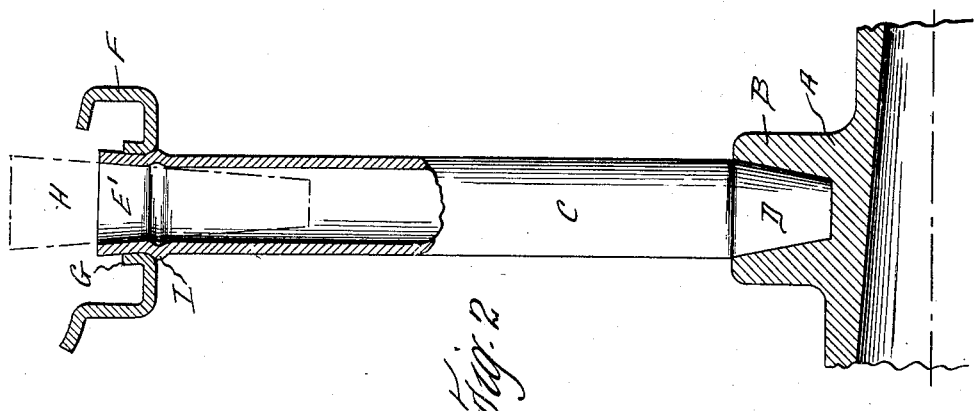
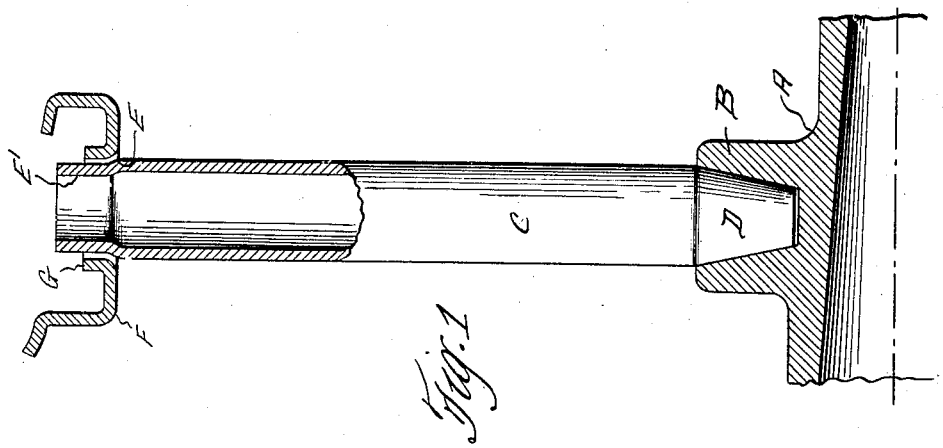
Inventor
J. H. Wagenhorst
By
Hull Brock & West
Attys.

Patented Dec. 3, 1929

1,737,780

UNITED STATES PATENT OFFICE

JAMES H. WAGENHORST, OF JACKSON, MICHIGAN

METHOD OF MAKING TUBULAR SPOKED WHEELS

Application filed March 4, 1922. Serial No. 541,008.

My invention relates generally to the method of making automobile wheels having tubular sheet metal spokes. The object of my invention is to provide an exceedingly simple and inexpensive method of constructing such wheels by which a strong and durable wheel is constructed and the spokes will be properly positioned in the hub and placed under compression while having their outer ends fixed to the fixed rim of the wheel body. A further object of my invention consists in providing a method of making tubular spoked wheels, in which the spokes are inserted through spoke holes in the fixed rim and passed radially inward to seats in the hub and the outer ends of the spokes are then expanded and rigidly attached to the fixed rim while the spoke is placed under the necessary radial compression so that the spokes will be securely seated and connected to the hub and fixed rim respectively.

With these various objects in view the invention consists in the novel features of construction and in the various steps involved in the making of the wheel all of which will be fully described hereinafter and pointed out in the claims.

In the drawings forming part of this specification, Fig. 1 is a detail sectional view showing the rim hub and spoke and the first step in the method of making the wheel; Fig. 2 is a similar view illustrating the second step; and Fig. 3 is a similar view illustrating the final step.

In carrying out my invention I employ a hub A which may be of cast or forged metal and which is provided with radially disposed spoke sockets B, said sockets tapering towards the center of the wheel body as shown.

The spokes C are of tubular sheet metal and have their inner ends swaged or otherwise contracted into a substantially conical form shown at D in order to fit snugly into the conical or tapering hub sockets B. The spoke C is of substantially uniform diameter from the tapered end to the point E adjacent the outer end of the spoke and at this point an annular shoulder is provided and the remaining outer portion of the spoke is slightly contracted as shown at E'.

F indicates the fixed rim of the wheel body which in the present instance is shown in the form of a channeled sheet metal rim adapted to receive a demountable tire carrying rim thereon, but it will be understood that the invention is equally adapted for other types of fixed rims.

The base of the fixed rim is formed with outwardly projecting spoke sockets G, the base of the fixed rim being apertured and the metal carried outwardly.

This opening in the base is sufficiently large to permit the spoke to be passed therethrough and the tapered end D of the spoke positioned in the tapered socket B of the hub.

After the spoke has been thus positioned a wedging and expanding tool H is inserted in the outer end of the tubular spoke and the outer end is expanded so as to provide an annular enlargement I which contacts with the inner edge of the spoke socket and completely fills the opening and bears against the inner face of the rim at the edge of the spoke socket, and at the same time that the upper end of the spoke is expanded, so as to completely occupy the spoke socket, the spoke as a whole is forced longitudinally inwardly so as to bring the tapered end D firmly seated into the hub socket as most clearly shown in Fig. 2.

The extreme outer end of the spoke is then rolled or peened over upon the outwardly projecting spoke socket as most clearly shown at K, thereby effectively connecting the outer end of the spoke to the fixed rim after the spoke has been forced inwardly and at the same time expanded outwardly so as to fixedly connect the outer portion of the spoke and rim. The outer end of each spoke is rolled or peened over the flange F forming the spoke socket by means of one or more radially acting plungers which are moved radially inward and engage the outwardly projecting end of the spoke and expand it and turn or curl it over the projecting spoke socket flange F into the position shown in Fig. 3. For instance, this operation may be performed in two steps, using in the first step a plunger having a tapered leading portion entering the spoke and an inclined annular shoulder surrounding the leading portion which bends the outer end of the spoke outwardly over the outer edge of the spoke socket flange. The peening over of the spoke ends may then be completed in a second step by the use of another plunger having a leading portion entering the spoke and an annular groove surrounding it conforming to the shape that the outer end of the spoke assumes, as shown in Fig. 3.

By constructing the wheel in the manner herein shown and described, I am able to provide an exceedingly strong and durable construction of wheel embodying a hub, tubular spokes and a sheet metal fixed rim or felly.

The inner ends of the spokes can be accurately swaged or contracted into the proper form to snugly fit the hub sockets and the openings in the fixed rim or felly being properly sized, readily permit the spokes to be passed therethrough, and then by driving the spokes inwardly a firm and positive connection between the inner ends of the spokes and the hub is obtained and at the same time the spoke is placed under compression and the upper portion thereof expanded so as to lock said upper portion into engagement with the inner face of the rim, and then by rolling the extreme outer end of the spoke over the outwardly projecting edges of the spoke socket, the rim is securely connected to the expanded outer portion of the spoke and all danger of movement at these points entirely eliminated.

Having thus described my invention what I claim is:

1. The method of making wheels comprising assembling a hub having spoke sockets within a sheet metal rim having spoke holes therein, inserting the inner ends of metal spokes through said spoke holes and moving said spokes radially inward to bring their inner ends into seating engagement in said sockets, and then expanding each spoke on opposite sides of said rim to fasten the spokes in position.

2. The method of making wheels comprising assembling a hub having spoke sockets within a sheet metal rim having spoke holes therein, passing metal spokes through said spoke holes to bring their inner ends into seating engagement in said sockets, expanding each spoke against the inner face of said rim and simultaneously forcing the spoke radially inward into the socket in the hub, and then turning over the outer end of each spoke against the outer face of the rim.

3. The method of making wheels comprising assembling a hub having spoke sockets within a sheet metal rim having spoke holes therein, inserting the inner ends of tubular metal spokes through said spoke holes and moving said spokes radially inward to bring their inner ends into seating engagement with said sockets, and then expanding each tubular spoke on opposite sides of said rim to fasten the spokes in position.

4. The method of making wheels comprising assembling a hub having spoke sockets within a sheet metal rim having spoke holes therein, passing tubular metal spokes through said spoke holes to bring their inner ends into seating engagement in said sockets, expending each tubular spoke into engagement with the inner face of said rim and simultaneously forcing the spoke radially inward into the socket of the hub, and then turning over the outer end of each spoke against the outer face of the rim.

5. The method of making wheels comprising assembling a hub having spoke sockets within a sheet metal rim having spoke holes therein, passing tubular metal spokes through said spoke holes to bring their inner ends into seating engagement in said sockets, forming a bead in each tubular metal spoke engaging the inner face of the rim and simultaneously forcing the spoke radially inward into the socket in the hub, and then turning over the outer end of each spoke against the outer face of the rim.

6. The method of making wheels comprising assembling a hub having spoke sockets within a sheet metal rim having spoke holes therein, inserting the inner ends of tubular metal spokes through said spoke holes and moving said spokes radially inward to bring their inner ends into seating engagement in said sockets, forming beads in said tubular spokes in engagement with the inner face of the rim, and then rolling over the outer end of each spoke into engagement with the outer face of said rim.

7. The method of making wheels comprising assembling a hub having spoke sockets within a sheet metal channel-shaped felly having spoke holes in the base thereof, inserting the inner ends of tubular metal spokes through said spoke holes and moving said spokes radially inward to bring their inner ends into seating engagement within said sockets, expanding the outer portion of each tubular spoke to form a bead engaging the inner face of said rim, and then rolling over the outer end of each spoke into engagement with the outer face of the base of said felly.

8. The method of making wheels which consists in passing the inner ends of tubular metal spokes inwardly through an apertured sheet metal rim and positioning the said inner ends in recesses upon the exterior of a hub, each tubular metal spoke having an annular enlargement near the outer end of such size as to pass through the aperture in the rim, and then expanding the upper portion of said spoke to bring the annular enlargement into contact with the inner side of the rim and finally turning over the extreme outer end of the spoke upon the outer side of the rim.

9. The method of making wheels which consists in providing a hub having radially disposed inwardly tapering recesses, and a fixed sheet metal rim having openings in the base thereof, providing a series of spokes having tapered ends, passing said spokes inwardly through the apertures of the fixed rim and positioning the inner ends thereof in the said hub recesses, expanding that portion of the spoke adjacent the inner face of the rim into contact therewith, and peening over the outer end of the spoke to engage the outer face of the rim.

In testimony whereof, I hereunto affix my signature.

JAMES H. WAGENHORST.